US010087045B2

(12) United States Patent
Stolt et al.

(10) Patent No.: US 10,087,045 B2
(45) Date of Patent: Oct. 2, 2018

(54) SYSTEM, MACHINERY BRAKE AND METHOD FOR CONTROLLING THE MACHINERY BRAKE

(71) Applicants: Lauri Stolt, Helsinki (FI); Tuukka Korhonen, Tuusula (FI)

(72) Inventors: Lauri Stolt, Helsinki (FI); Tuukka Korhonen, Tuusula (FI)

(73) Assignee: KONE CORPORATION, Helsinki (FI)

( * ) Notice: Subject to any disclaimer, the term of this patent is extended or adjusted under 35 U.S.C. 154(b) by 0 days.

(21) Appl. No.: 15/357,137

(22) Filed: Nov. 21, 2016

(65) Prior Publication Data

US 2017/0066624 A1 Mar. 9, 2017

Related U.S. Application Data

(63) Continuation of application No. PCT/IB2015/054586, filed on Jun. 18, 2015.

(30) Foreign Application Priority Data

Jun. 19, 2014 (FI) .................................. 20145597

(51) Int. Cl.
*F16D 65/14* (2006.01)
*B66B 1/32* (2006.01)
(Continued)

(52) U.S. Cl.
CPC .................. *B66B 1/32* (2013.01); *B66B 5/02* (2013.01); *B66B 5/08* (2013.01); *B66D 5/30* (2013.01); *F16D 49/00* (2013.01)

(58) Field of Classification Search
CPC .. B66B 1/32; B66B 1/304; B66B 5/02; B66D 5/08; B66D 5/30; F16D 65/14
(Continued)

(56) References Cited

U.S. PATENT DOCUMENTS 4,987,977 A * 1/1991 Nomura .................... B66B 1/32
187/288
5,717,174 A * 2/1998 Ramos ...................... B66B 1/32
187/288
(Continued)

FOREIGN PATENT DOCUMENTS

CN 1478050 A 2/2004
CN 1997578 A 7/2007
(Continued)

OTHER PUBLICATIONS

International Search Report PCT/ISA/210 for International Application No. PCT/IB2015/054586 dated Oct. 20, 2015.
(Continued)

*Primary Examiner* — Christopher P Schwartz
(74) *Attorney, Agent, or Firm* — Harness, Dickey & Pierce, P.L.C.

(57) ABSTRACT

The system for controlling the opening and/or closing of a normally-closed machinery brake opening by means of at least one magnetizing coil and closing by means of at least one closing spring comprises:
at least one estimation and control loop according to the invention and at least one measuring and control circuit according to the invention,
which are connected or can be connected to each other, and
of which
a) the estimation and control loop is configured to use an input (I(t)) produced by the measuring and control circuit, and
b) the measuring and control circuit is configured to use the modulation reference ($U_{GE}$) produced by the estimation and control loop for connecting the voltage ($U_9$) to be connected over the magnetizing coil.

10 Claims, 5 Drawing Sheets

Figure 4:
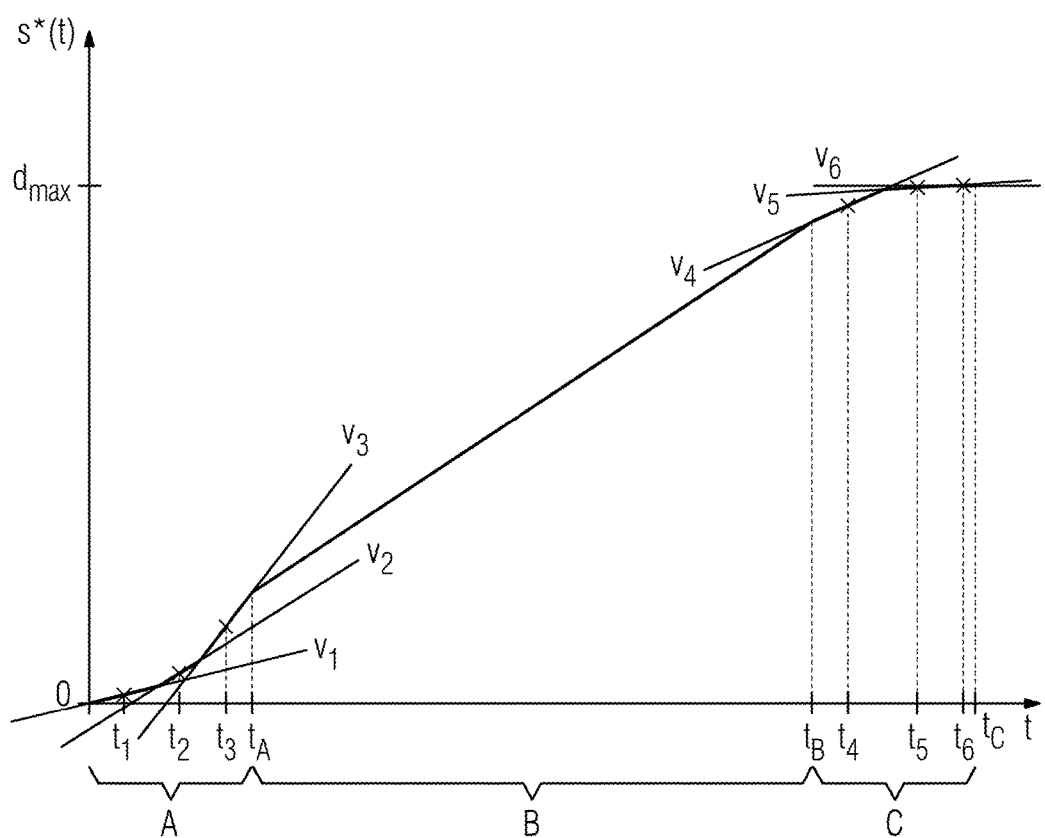

(51) Int. Cl.
    *B66D 5/30*     (2006.01)
    *B66D 5/08*     (2006.01)
    *B66B 5/02*     (2006.01)
    *F16D 49/00*     (2006.01)

(58) Field of Classification Search
    USPC ..... 187/288, 296, 391; 188/67, 74, 156, 164
    See application file for complete search history.

(56) References Cited

U.S. PATENT DOCUMENTS

| | | | |
|---|---|---|---|
| 8,235,180 B2* | 8/2012 | Kattainen | B66B 1/32 187/288 |
| 9,046,142 B2* | 6/2015 | Kattainen | H02P 3/04 |
| 9,233,818 B2* | 1/2016 | Ekholm | B66D 5/30 |
| 9,731,935 B2* | 8/2017 | Stolt | B66B 1/304 |

FOREIGN PATENT DOCUMENTS

| | | |
|---|---|---|
| CN | 102203452 A | 9/2011 |
| EP | 0897371 A1 | 2/1999 |
| EP | 1431226 A1 | 6/2004 |
| EP | 1544148 A1 | 6/2005 |
| GB | 2225679 A | 6/1990 |
| JP | 2000509357 A | 7/2000 |
| JP | 2007-040975 A | 2/2007 |
| KR | 10-0807943 B1 | 2/2008 |
| WO | WO-2006/033165 A1 | 3/2006 |
| WO | WO-2008/129672 A1 | 10/2008 |
| WO | WO-2009/024168 A1 | 2/2009 |
| WO | WO-2010/061049 A1 | 6/2010 |
| WO | WO-2012/152998 A2 | 11/2012 |

OTHER PUBLICATIONS

Written Opinion of the International Searching Authority PCT/ISA/237 for International Application No. PCT/IB2015/054586 dated Oct. 20, 2015.

Finish Search Report for Finish Application No. 20145597 dated Feb. 11, 2015.

Chinese Office Action dated Mar. 16, 2018 issued in Chinese Application No. 201580033028.8 (with translation).

* cited by examiner

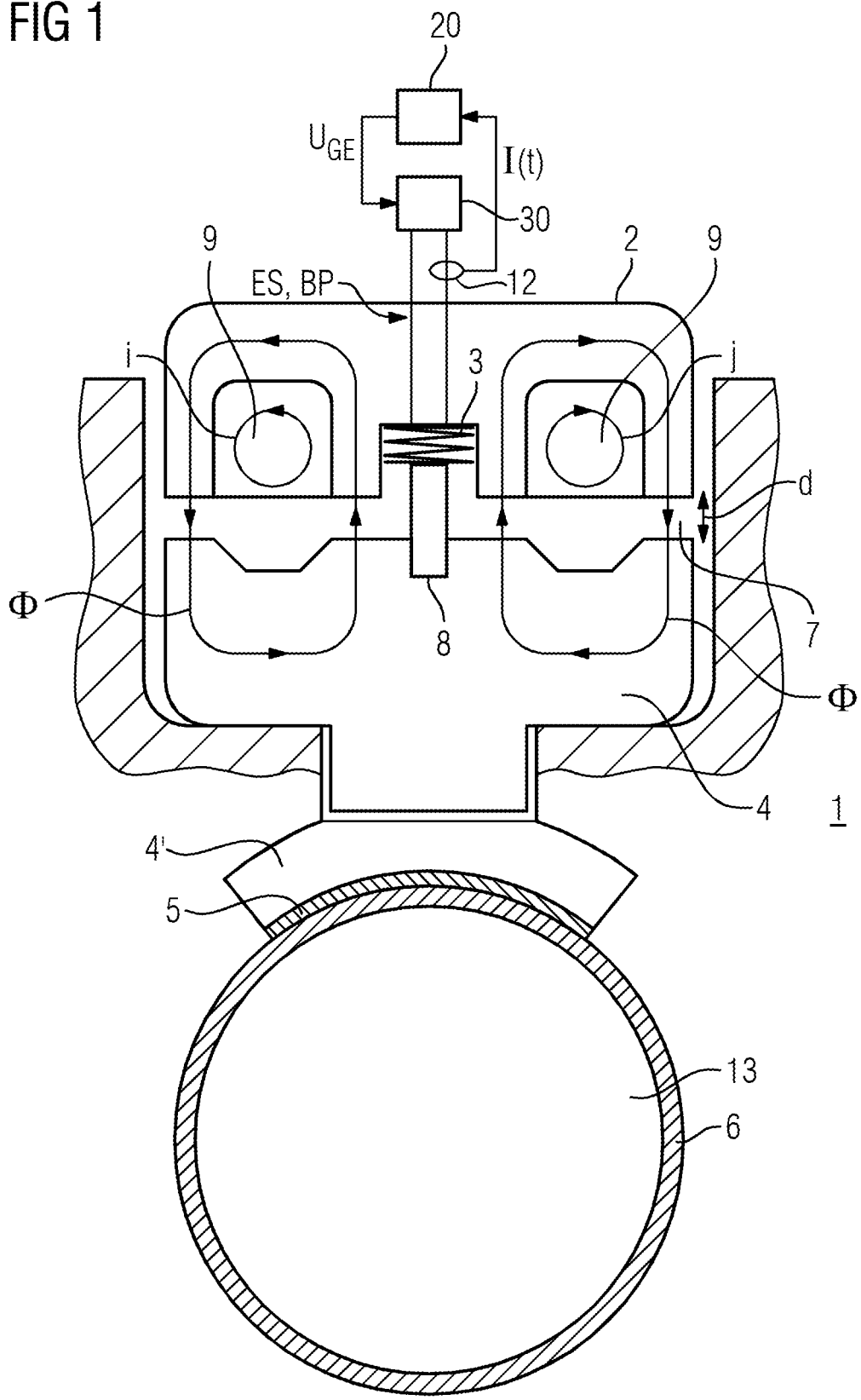

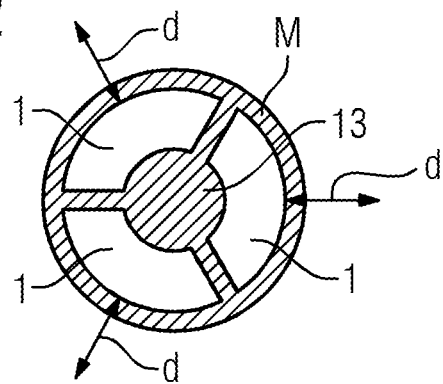
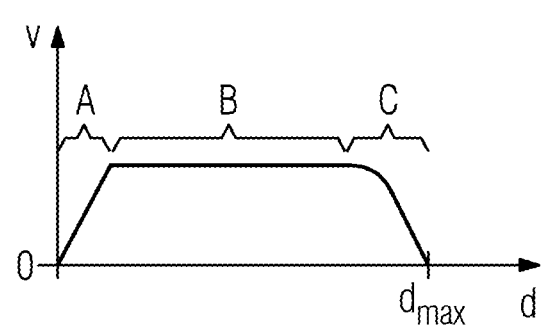

SYSTEM, MACHINERY BRAKE AND METHOD FOR CONTROLLING THE MACHINERY BRAKE

This application is a continuation of PCT International Application No. PCT/IB2015/054586 which has an International filing date of Jun. 18, 2015, and which claims priority to Finnish patent application number 20145597 filed Jun. 19, 2014, the entire contents of each of which are incorporated herein by reference.

FIELD OF THE INVENTION

The invention relates to normally-closed machinery brakes and more precisely to determining the magnitude of the air gap of a normally-closed machinery brake and to controlling this type of machinery brake. Some embodiments of the invention relate to damping the opening noise and closing noise of a normally-closed machinery brake.

TECHNICAL BACKGROUND

Machinery brakes are generally used in mechanical engineering for braking rotating motors or machine parts.

A normally-closed machinery brake refers to the type of machinery brake that has at least one magnetizing coil, which when it is energized the closed machinery brake opens and when it is de-energized the opened machinery brake closes and remains closed, usually when forced by the spring force bringing about the closing. The opposite of a normally-closed machinery brake can be regarded as a normally open machinery brake, which is closed by energizing the magnetizing coil.

One special application for this type of normally-closed machinery brakes is the operational brakes of elevators. This increases elevator safety, because an elevator car moving up and down in an elevator hoistway must be stopped in the event of an electricity outage. The operational brakes of an elevator are kept closed when the elevator has stopped. The operational brakes of an elevator are opened when the elevator starts moving and are closed when the elevator stops.

In order for a normally-closed machinery brake to react quickly enough for removal of the energization of the magnetizing coil, it is usual for a normally-closed machinery brake to comprise a powerful closing spring. A powerful closing spring takes a moving brake shoe quickly against the brake drum, which can cause a noise that is experienced as disturbing. In order for a powerful closing spring to be compressed for opening the brakes, the brake shoe must be moved with a strong force. The metallic bearer parts of the brake shoe can produce a noise that is experienced as disturbing when the opening movement ends.

For solving the damping problem of the opening noise and closing noise of a normally-closed machinery brake, known in the art is a solution presented in the applicant's international application, which is published as printed publication WO 2012/152998 A2, said solution being the placement of an elastically flexible damper between the frame part of a normally-closed machinery brake and the bearer being moved by an electromagnet in relation to said frame part.

Also known in the art, from Inventio AG's European patent 0 897 371, for solving the damping problem of the opening noise and closing noise of a normally-closed machinery brake, is an elevator brake wherein the desired speed profile for movement of the brake shoes is formed as a function of the position of the brake shoes and the speed of the brake shoes is adjusted to be according to the speed profile by adjusting the current of the magnetizing coil of the brake. The position data of the brake shoe is detected mechanically by means of a potentiometer connected to the bearer plate. This enables the closing of an elevator brake softly.

AIM OF THE INVENTION

The operational brake for an elevator known from European patent 0 897 371 comprises a potentiometer that is subject to wear. When using this type of operational brake for an elevator, a slide (in German, Schleifer) travels along a position sensor (in German, Weggeber) each time the operational brake is used, i.e. each time the elevator must start to move and each time the elevator must stop.

The aim according to the first aspect of the current invention is to improve the method for determining the air gap of a normally-closed machinery brake, with regard in particular to wear-resistance, and on the other hand to diversify the control of the machinery brake. This aim can be resolved, insofar as determining the air gap is concerned, by means of a system according to independent claim 1. Insofar as the control of a machinery brake is concerned, the aim can be resolved by means of a system according to independent claim 1, and likewise by means of the parallel method claim 8.

The aim according to the second aspect of the invention is to reduce the opening noise and/or closing noise of a quietly closing/opening normally-closed machinery brake in normal operation. This aim can be resolved by using a system according to claim 2 and a method according to claim 10.

The aim according to the third aspect of the invention is to diversify the control of a normally-closed machinery brake in normal operation. This aim can be resolved by means of a machinery brake according to claim 6 and by means of a method according to claim 9.

With the expression "normal operation" we emphasize the difference between normal operation (BP) and emergency operation (ES): in elevator use in an emergency situation the elevator car must be stopped as soon as possible and in this case the noise produced by the closing of the machinery brake is not, of course, considered disturbing. In emergency use a normally-closed machinery brake does not therefore need to close softly, but instead as quickly as is possible.

The dependent claims describe preferred embodiments of the system and of the method.

Advantages of the Invention

The system for controlling the opening and/or closing of a normally-closed machinery brake opening by means of at least one magnetizing coil and closing by means of at least one closing spring comprises at least the following connected or connectable to each other:

a) at least one estimation and control loop for controlling the opening and/or closing of a machinery brake, which estimation and control loop comprises:
  at least one calculation element, in which is recorded the target air gap values of the machinery brake;
  at least one air gap estimator, which is configured to produce an estimated air gap value on the basis of an input by measuring the inductance of a magnetizing coil from a current ripple;

at least one air gap regulator, which is configured to produce a target value for the current of the magnetizing coil on the basis of the target air gap value and estimated air gap value of the machinery brake; and a current regulator, which is configured to produce a modulation reference on the basis of the target value and input for the current of the magnetizing coil; and b) at least one measuring and control circuit for controlling the opening and/or closing of a machinery brake, which measuring and control circuit comprises:

at least one magnetizing coil;

an amplifier circuit, which is configured to produce a control voltage on the basis of the modulation reference;

a power output stage controllable with a control voltage for connecting voltage over the magnetizing coil at a frequency, which is greater than the frequency cut-off determined by the time constant L/R of the magnetizing coil; and an ammeter for producing an input for measuring the magnetizing current brought about by the voltage connected over the magnetizing coil;

of which:

c) the estimation and control loop is configured to use the input produced by the measuring and control circuit; and d) the measuring and control circuit is configured to use the modulation reference produced by the estimation and control loop for connecting voltage over the magnetizing coil.

In addition to this, e) the system is also configured to adjust the voltage to be connected over the magnetizing coil on the basis of the change in the measured inductance of the magnetizing coil.

By means of the system the magnitude of the air gap is estimated indirectly and the estimate data is used for controlling the machinery brake. This not only improves the wear-resistance of the system compared to the arrangement presented in European patent 0 897 371, but also diversifies the control of a machinery brake.

Indirect measurement is realized by means of measuring a change in the magnetizing current brought about by the voltage to be connected over the magnetizing coil. Therefore, the change in the inductance of the magnetizing coil is in fact measured. This enables the controlling of a machinery brake without direct feedback of the magnitude of the air gap of the armature, improving servicing freedom.

The voltage to be connected is connected at a frequency that is greater than the frequency cut-off determined by the time constant L/R of the magnetizing coil.

When at least some of the target air gap values are selected in such a way that their time derivative or temporal speed variation decreases in the opening and/or closing area when the target air gap value approaches the maximum value of the opening area or the minimum value of the closing area, it is possible to dampen the opening noise and/or closing noise of a normally-closed machinery brake. Compared to the solution described in printed publication WO 2012/152998 A2, an elastically flexible damping member that possibly wears in use and possibly hardens over time can be omitted. On the other hand, compared to the solution presented in European patent 0 897 371, it is possible to realize soft opening and/or closing of a machinery brake in normal operation (BS) softly, without using a measuring potentiometer that wears in use, for estimating the magnitude of the air gap.

When the graph of the target air gap values is determined experimentally when closing and/or opening the machinery brake, it is possible on the basis of the testing runs made for closing and/or opening of the machinery brake to verify suitable values from the viewpoint of the operation of exactly the normally-closed machinery brake in question. This facilitates management of installation tolerances. Normally-closed machinery brakes all differ more or less to each e.g. with respect to the spring constant of the return spring. Thus it might be possible to slacken the manufacturing tolerances. Most preferably the air gap regulator is ramped experimentally between the target air gap values determined.

When the system is configured to adjust the voltage to be connected over the magnetizing coil on the basis of the change in the measured inductance of the magnetizing coil, the system can be realized by using a well-defined physical magnitude.

According to the third aspect of the invention a normally-closed machinery brake opening by means of at least one magnetizing coil and closing by means of at least one closing spring comprises a system according to the first or second aspect of the invention, which system is configured to control the magnetizing coil for opening and/or closing the machinery brake. The current to be connected over the magnetizing coil is controlled by means of target air gap values in response to the input of the current brought about by the control voltage of the magnetizing coil. This type of normally-closed machinery brake can be controlled in a more versatile manner than a normally-closed machinery brake controlled with just an on/off type of magnetizing coil control.

A machinery brake according to the third aspect of the invention can be very advantageously used as the machinery brake of an elevator. In this case the control of the machinery brake of an elevator can be managed in normal operation (BS) better, and thus e.g. the relationship between the operating noise and the operating speed of the operational brake can be adapted. In emergency operation (ES) the machinery brake is best closed, of course, by switching the magnetizing coil to immediately de-energize.

In the method for controlling a normally-closed machinery brake opening by means of at least one magnetizing coil and closing by means of at least one closing spring, a system according to the first or second aspect of the invention for controlling the voltage to be connected over the magnetizing coil, is/are used. Preferably the machinery brake to be used is a normally-closed machinery brake according to the third aspect of the invention, in which machinery brake the voltage to be connected with control voltage is taken from the intermediate circuit of a frequency converter.

In the method the target air gap values are most preferably optimized to dampen the opening noises and/or closing noises of the machinery brake. In this way it is possible not only to diversify the control of a normally-closed machinery brake but also to dampen its operating noise.

LIST OF DRAWINGS

Figure 5:
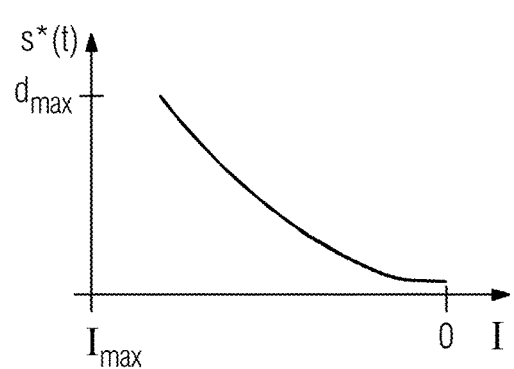
Figure 6:
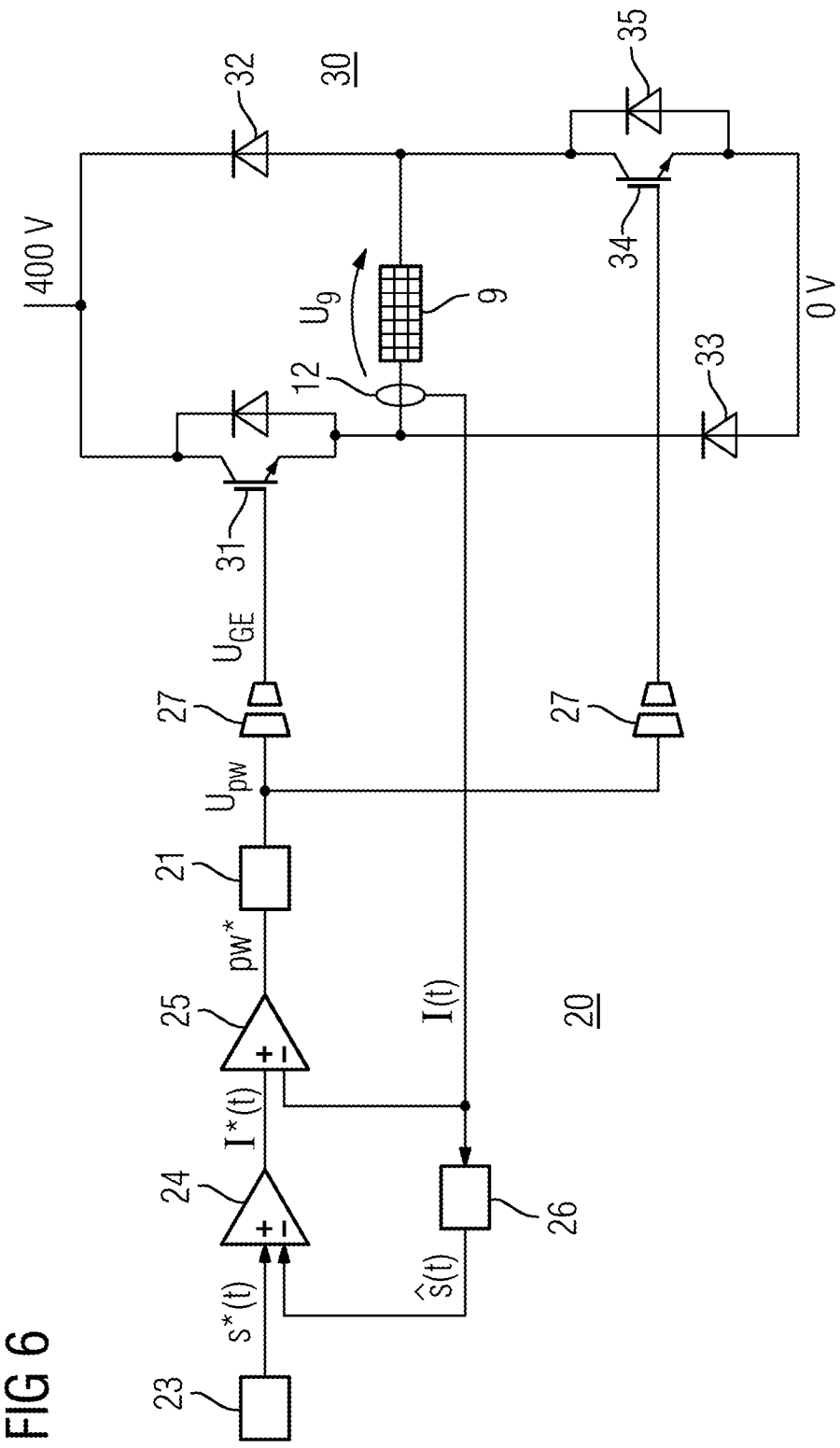
Figure 7:
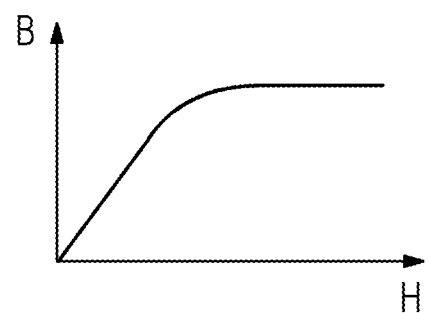
Figure 8:
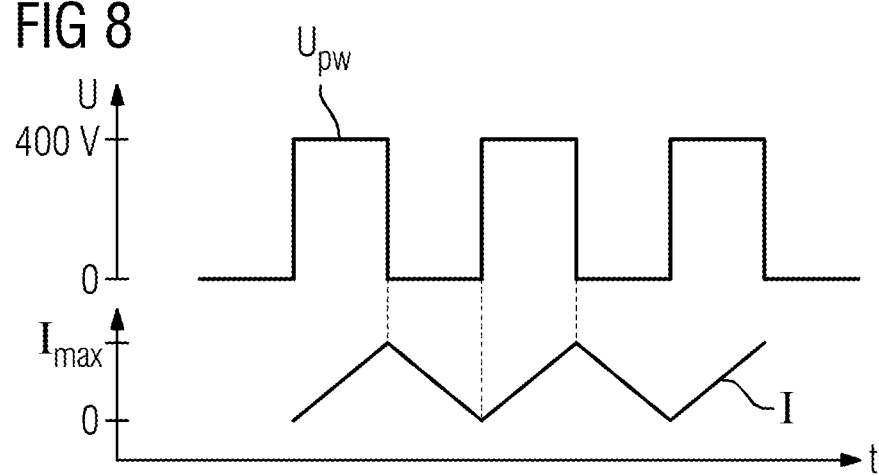

In the following the operational brake of an elevator and the elevator will be presented in more detail by the aid of the exemplary embodiments presented in the drawings FIGS. 1-8. Of the drawings:

FIG. 1 is a simplified diagram of the main components of a machinery brake;

FIG. 2 presents the shaft of an elevator motor, around which are three machinery brakes;

FIG. 3 describes the speed profile desired from a machinery brake in a normal operating situation (BS);

FIG. 4 describes the time profile of the target air gap for the air gap of a machinery brake;

FIG. 5 describes the current flowing through the magnetizing coil of a machinery brake as a function of the magnitude of the air gap;

FIG. 6 presents a system configured for controlling a normally-closed machinery brake opening by means of at least one magnetizing coil and closing by means of at least one closing spring, the system comprising an estimation and control loop connected to a measuring and control circuit;

FIG. 7 describes the interdependency of the magnetization of the magnetizing coil and the magnetic field; and FIG. 8 illustrates the dependency of current ripple, i.e. peak value $I_{max}$ and minimum value 0, on the pulse-width voltage.

The same reference numbers refer to the same technical parts in all the FIGs.

DETAILED DESCRIPTION

FIG. 1 is a simplified diagram of the main components of a normally-closed machinery brake 1. The machinery brake 1 comprises a frame part 2, inside which is at least one magnetizing coil 9. The machinery brake 1 also comprises a bearer 4 that is movable with respect to the frame part 2, which bearer, depending on the model implemented, can be a disc 4'. The movement of the bearer 4 moves the brake shoe 5. The to-and-fro movement of the bearer 4 occurs most preferably limited by a guide 8 (e.g. a guide bolt or guide rod).

The machinery brake 1 is a normally-closed machinery brake. When the magnetizing coil 9 is not energized, the closing spring 3 (e.g. a cup spring and/or spring set) pushes the bearer 4 farther from the frame part 2. In this case an air gap 7 remains between the frame part 2 and the bearer 4, the magnitude d of which air gap 7 is negatively proportional with respect to the brake shoe 5 and the brake drum 6 on the surface of the rotating part 13 being braked. In other words, when d=0, the distance of the brake shoe 5 from the brake drum 6 is at its maximum (machinery brake fully open) and when $d=d_{max}$, the brake shoe 5 is pressed tight against the brake drum 6 (the machinery brake 1 is in this case closed).

The magnetizing coil 9 is presented in drawing FIG. 1, in the state in which it is not energized: The measuring and control circuit 30 has not in this case connected voltage $U_9$ over the magnetizing coil 9. The weakening force brought about by the magnetic field Φ produced in the frame part 2 of the magnetizing coil 9 and over the air gap 7 and also in the bearer 4 after the voltage $U_9$ has been disconnected is in this case no longer able to resist the closing force produced by the closing spring 3, after which the machinery brake 1 has closed.

FIG. 2 presents the shaft 13 of an elevator motor M, around which are three machinery brakes 1 that form the operational brake, or a part thereof, of the elevator. Instead of three separate machinery brakes 1, some other number (2, 3, 4, 5, 6, . . .) enabling redundancy can be selected. Marked in FIG. 2 is the magnitude d of the air gaps, i.e. each machinery brake 1 has its own air gap 7.

Instead of separate machinery brakes 1, a machinery brake 1 provided with bearers/discs, each of which moving a brake shoe 5, that are provided with a redundancy-enabling number (2, 3, 4, 5, 6, . . .) of dedicated closing springs 3 is conceivable.

The closing spring 3 of the machinery brake 1 keeps the operational brake 1 closed, i.e. it presses the brake shoe 5 and the disc 4' against the brake drum 6 when the magnetizing coil 9 of the electromagnet is not energized.

When the magnetizing coil 9 of the electromagnet is energized, the attraction force of the electromagnet exceeds the thrusting force of the closing spring 3, in which case the brake shoe 5 and the disc 4' move closer to the frame part 2, in which case the machinery brake 1 opens.

From the viewpoint of the operation of the electromagnet, it is essential that the frame part 2 is of a magnetically conductive (ferromagnetic) material and that the bearer 4 and possibly also the disc 4' is/are of a magnetically conductive material. An air gap 7 must remain between the frame part 2 and the bearer 4.

FIG. 3 describes the speed profile desired from a machinery brake in a normal operating situation (BS). When starting the opening of the machinery brake 1 (from point $d_{max}$ when shifting to the left) the bearer 4, disc 4' and brake shoe 5 accelerate from the idle state to their maximum speed. When the machinery brake is fully open (to point 0 when shifting from the left) the machinery brake 1 should not make a sudden stop but instead should decelerate during the deceleration distance. Marked in FIG. 3 are the acceleration area C, moving area B and deceleration area A of the opening of the machinery brake 1. Correspondingly, when closing the machinery brake 1 A would be the acceleration area, B the moving area and C the deceleration area.

FIG. 4 describes the time profile of the targeted air gap s*(t) for the machinery brake 1 in the case of the speed profile according to FIG. 3. When shifting from left to right in area A at the moment in time $t_1$ the speed $v_1$ increases by the moment $t_2$ to the speed $v_2$ and further by the moment $t_3$ to the speed $v_3$. When shifting from right to left the speed decreases correspondingly, i.e. $v_3$->$v_2$->$v_1$.

When shifting from left to right in area C at the moment in time $t_4$ the speed $v_4$ decreases by the moment $t_5$ to the speed $v_5$ and further by the moment $t_6$ to the speed $v_6$. When shifting from right to left the speed increases correspondingly, i.e. $v_6$->$v_5$->$v_4$.

Between the moments $t_A$ and $t_B$, i.e. in the movement area B, the speed of change in the targeted air gap, i.e. the speed of movement of the bearer 4, disc 4' and brake shoe 5, remains roughly constant. Instead of constant speed, any other speed profile whatsoever can, of course, be defined for the movement area B.

FIG. 5 describes the current I flowing through the magnetizing coil of a machinery brake as a function of the magnitude of the target air gap value s*(t). When the target air gap value s*(t) decreases (describing a smaller air gap 7), the machinery brake stays open with a smaller current I.

FIG. 6 presents a system configured for controlling a normally-closed machinery brake 1 opening by means of at least one magnetizing coil 9 and closing by means of at least one closing spring 3, the system comprising a estimation and control loop 20 connected to a measuring and control circuit 30.

The calculation element forms the target air gap value s*(t), i.e. the reference value for the air gap.

The air gap regulator 24 compares the target air gap value s*(t) to the estimated air gap value sˆ(t), i.e. to the air gap estimate, calculated by the air gap estimator 26, and on the basis of the comparison calculates the target value I*(t) for the magnetizing coil current, i.e. calculates the reference value for the current I of the magnetizing coil 9 of the electromagnet.

The reference value for current, i.e. the target value I*(t) for the current of the magnetizing coil, is supplied to the current regulator 25, which compares the target value I*(t)

of the current of the magnetizing coil to the input, i.e. to the measured current I(t) of the magnetizing coil 9, and forms a modulation reference PW* for the pulse-width generator 21 (which can be a pulse width modulator).

The pulse ratio of the pulse width modulation (PWM) of the pulse width generator 21 to the control signal, i.e. the modulation index, is calculated on the basis of the aforementioned modulation reference PW*.

In other words, the modulation reference PW* (e.g. pulse-width reference) is determined on the basis of the target value I*(t) for the current of the magnetizing coil in the current regulator 25 and on the basis of the input I(t). On the basis of the modulation reference PW*, the pulse-width generator 21 makes pulse-width voltage $U_{PW}$. The pulse-width voltage $U_{PW}$ is supplied to an amplifier circuit such as one or more optoisolators 27, which form(s) a modulation reference $U_{GE}$ on the basis of it.

With the modulation reference $U_{GE}$ a controllable power output stage is controlled. The controllable power output stage can be realized e.g. as a bridge made by means of two or more IGBTs 31, 34 and possible rectifiers (e.g. diodes 32, 34). By means of the controllable power output stage, suitable voltage $U_9$ is connected over the magnetizing coil 9. Instead of, or in addition to, the IGBTs 31, 34, e.g. MOS-FETs can be used in the controllable power output stage.

At the point of the magnetizing coil 9 the current I(t) is measured with an ammeter 12. The measurement result of the current I(t) is then supplied in the manner described above not only to the air gap estimator 26 but also to the current regulator 25.

FIG. 7 describes the density B of the magnetic flux as a function of the magnetic field strength H. The magnetomotive force $\Theta = N\,I$ (N=number of turns in the coil, I is the current flowing through the conductor of the magnetizing coil) traveling through the magnetizing coil 9 produces a magnetic field having a strength of $H = \Theta/l_m$, where $l_m$ is the mean length of the field line.

FIG. 8 illustrates the principle of the dependency of the peak value $I_{max}$ and minimum value 0 of the current ripple on the pulse-width voltage $U_{PW}$.

The inventors have observed that the magnitude of the air gap 7 of a machinery brake 1 affects the inductance of the magnetizing coil 9 and consequently the speed of change of the current. By ascertaining this dependency, e.g. with calibration runs, it is possible to utilize the information for formulating the description I(t)->ŝ (t) of the air gap estimator 26.

In other words, the control current of an electromagnetically controllable normally-closed machinery brake 1 can be adjusted for damping the noise of the machinery brake 1. Since the position feedback of the bearer 4, disc 4' and brake shoe 5 are realized by measuring the inductance and/or change in inductance of the electromagnet of the machinery brake 1 from the current I of the magnetizing coil 9 of the electromagnet of the machinery brake, it is possible by controlling the voltage $U_9$ being connected over the magnetizing coil 9 to adjust the opening and/or closing of the machinery brake 1. The control voltage $U_9$ of the magnetizing coil 9 is preferably greater than is known in the art compared to the inductance of the machinery brake 1, so that good dynamics is achieved for adjusting the current I of the machinery brake 1 by means of the voltage $U_9$. This can be achieved e.g. by taking the voltage $U_9$ to be connected with the control voltage $U_{PW}$ from the intermediate circuit of a frequency converter, the voltage of which is approx. 540-600 V or even higher.

For example, a pulse width reference PW* with a frequency of 10 kHz and correspondingly a modulation reference $U_{GE}$ can be supplied to the control and adjustment circuit 30 in such a way that the force produced by the DC level of the current I exceeds the force of the closing spring 3 (i.e. the machinery brake 1 opens) and on the other hand the change in the switching frequency (e.g. 10 kHz) of the current is as linear as possible.

In the test performed the current was measured from the peak and from the minimum of the saw-tooth current I, in which case with the average of the foregoing the DC level is obtained and with the difference the amplitude of ripple is obtained. The amplitude of the ripple depends mainly on the inductance of the load because when supplying e.g. 0 V and 560 V voltages the resistive effect of the load starts to limit the rate of rise of the current in a manner determined by the time constant L/R of the magnetizing coil 9 of the machinery brake only when the current has been able to make a step response that is significantly longer than the cycle time (e.g. 1/10 kHz) of the switching frequency.

The inductance measured from the current ripple is then dependent on the inductance of the magnetizing coil 9 and on the air gap 7 of the magnetic circuit. In other words an estimate for the air gap 7 can be calculated from the inductance.

If/when a good enough estimate is obtained for the air gap 7, the position of the disc 4' can be controlled with a simple cascade control in which the outer control loop is the air gap regulator 24 and the inner loop is the current regulator 25.

The learning and/or calibration run of the disc 4' can be performed e.g. in such a way that the disc 4' is opened without feedback and it is seen from the air gap estimate what is the largest figure that the air gap 7 does not exceed. After this the maximum value for the air gap regulator 24 is set to the measured figure and the reference is always ramped only up to it. In other words, the reference is driven between closed/open, in which case the reference is made to be individual for each machinery brake 1.

The invention must not be regarded as being limited only to the claims below but instead should be understood to include all legal equivalents of said claims and combinations of the embodiments presented.

LIST OF REFERENCE NUMBERS USED d magnitude of air gap
M motor
Φ magnetic field
1 machinery brake
2 frame part
3 closing spring
4 bearer
4' disc
5 brake shoe
6 brake drum
7 air gap
8 guide
9 magnetizing coil
12 ammeter
13 braking rotating part
20 estimation and control loop
21 pulse width generator
23 calculation element
24 air gap adjuster
25 current regulator
26 air gap estimator
27 amplifier circuit (e.g. optoisolator)

30 measurement and control circuit
31 IGBT (power output stage part)
32 diode (power output stage part)
33 diode (power output stage part)
34 IGBT (power output stage part)

The invention claimed is:

1. A system for controlling an opening of a normally-closed machinery brake based on control of a magnetizing coil, the system comprising:
    at least one estimation and control loop configured to control the opening of the machinery brake, the at least one estimation and control loop including
        at least one calculation element, the at least one calculation element configured to record a target air gap value of an air gap defined by a spacing between a frame part and a bearer of the machinery brake,
        at least one air gap estimator, the at least one air gap estimator configured to determine an estimated air gap value of the air gap of the machinery brake based on an input received at the at least one air gap estimator, the input indicating a measured current of the magnetizing coil, the estimated air gap value determined based on determining an inductance of the magnetizing coil, the inductance determined based on a determined difference between a peak value and a minimum value of the measured current of the magnetizing coil,
        an air gap regulator, the air gap regulator configured to determine a target value of the current of the magnetizing coil based on the target air gap value of the machinery brake and the estimated air gap value of the machinery brake, and
        a current regulator, the current regulator configured to generate a modulation reference signal based on the target value of the current of the magnetizing coil and the input indicating the measured current of the magnetizing coil; and
    at least one measuring and control circuit, the at least one measuring and control circuit configured to control the opening of the machinery brake, the at least one measuring and control circuit including
        the magnetizing coil;
        an amplifier circuit, the amplifier circuit configured to produce a control voltage based on the modulation reference signal;
        a power output stage configured to connect a particular voltage over the magnetizing coil based on the control voltage, the power output stage configured to connect the particular voltage over the magnetizing coil at a particular frequency, the particular frequency greater than a frequency cut-off, the frequency cut-off based on a time constant of the magnetizing coil;
        an ammeter configured to generate an input indicating a measurement of a current of the magnetizing coil, the current of the magnetizing coil based on the particular voltage that is connected over the magnetizing coil;
        wherein the input generated by the measuring and control circuit is the input received at the at least one air gap estimator,
        wherein the system is configured to adjust the particular voltage that is connected over the magnetizing coil based on a change in the inductance of the magnetizing coil.

2. The system according to claim 1, wherein a time derivative or a temporal speed variation of the target air gap value of the air gap of the machinery brake decreases based on the target air gap value of the air gap of the machinery brake approaching a maximum value or a minimum value.

3. The system according to claim 1, wherein
    the target air gap values of the air gap of the machinery brake includes a plurality of experimentally determined target air gap values of the air gap of the machinery brake, and
    the air gap regulator is configured to ramp between the experimentally determined target air gap values of the air gap of the machinery brake.

4. The system according to claim 1, the amplifier circuit including an optoisolator.

5. The system according to claim 1, the amplifier circuit including at least one element of a digital isolator and an insulated-gate bipolar transistor (IGBT) driver.

6. A normally-closed machinery brake configured to be controlled by at least one magnetizing coil, wherein
    the machinery brake includes the system according to claim 1, and
    the power output stage of the system is configured to connect the particular voltage over the magnetizing coil based on the target air gap value of the air gap of the machinery brake in response to the input generated by the at least one measuring and control circuit.

7. The machinery brake according to claim 6, wherein the machinery brake is a machinery brake of an elevator, and
    the particular voltage that is connected with the control voltage is taken from an intermediate circuit of a frequency converter.

8. A method for controlling a normally-closed machinery brake based on a magnetizing coil, the method comprising:
    operating at least one estimation and control loop to control an opening of the machinery brake, the operating the at least one estimation and control loop including
        operating at least one calculation element to record a target air gap value of an air gap defined by a spacing between a frame part and a bearer of the machinery brake,
        operating at least one air gap estimator to determine an estimated air gap value of the air gap of the machinery brake based on an input received at the at least one air gap estimator, the input indicating a measured current of the magnetizing coil, the estimated air gap value determined based on determining an inductance of the magnetizing coil, the inductance determined based on a determined difference between a peak value and a minimum value of the measured current of the magnetizing coil,
        operating an air gap regulator to determine a target value of the current of the magnetizing coil based on the target air gap value of the machinery brake and the estimated air gap value of the machinery brake, and
        operating a current regulator to generate a modulation reference signal based on the target value of the current of the magnetizing coil and the input indicating the measured current of the magnetizing coil; and
    operating at least one measuring and control circuit to control the opening of the machinery brake, the operating the at least one measuring and control circuit including
        operating an amplifier circuit to produce a control voltage based on the modulation reference signal;

operating a power output stage to connect a particular voltage at a particular frequency over the magnetizing coil based on the control voltage, the particular frequency greater than a frequency cut-off, the frequency cut-off based on a time constant of the magnetizing coil; and operating an ammeter to generate an input indicating a measurement of a current of the magnetizing coil, the current of the magnetizing coil based on the particular voltage that is connected over the magnetizing coil;

wherein the input generated by the measuring and control circuit is the input received at the at least one air gap estimator, wherein the method further includes adjusting the particular voltage that is connected over the magnetizing coil based on a change in the inductance of the magnetizing coil.

9. The method of claim 8, wherein the power output stage is configured to connect the particular voltage over the magnetizing coil based on the target air gap value of the air gap of the machinery brake in response to the input generated based on the control voltage.

10. The method according to claim 8, wherein the target air gap values of the air gap of the machinery brake is optimized to dampen at least one noise of an opening noises of the machinery brake and a closing noises of the machinery brake.

* * * * *